W. J. KENNEY & H. P. GROHN.
AUTOMATIC STOKER.
APPLICATION FILED OCT. 12, 1908.
1,018,976.
Patented Feb. 27, 1912.
12 SHEETS—SHEET 12.
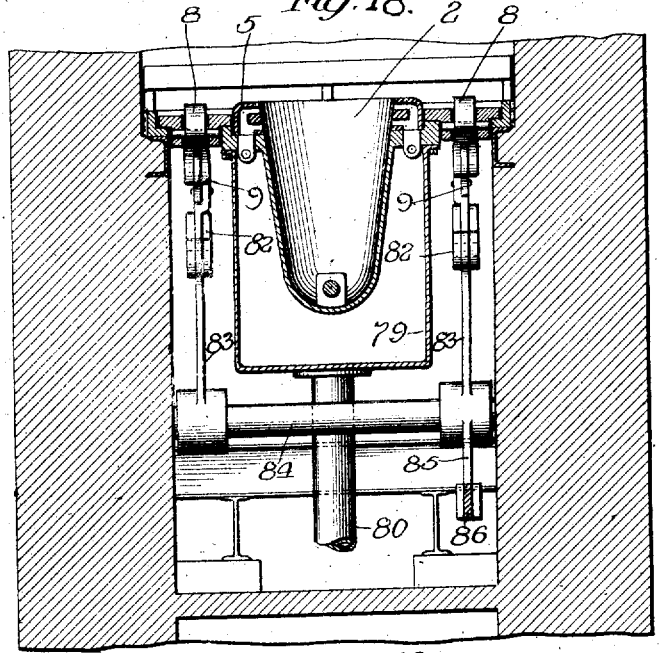
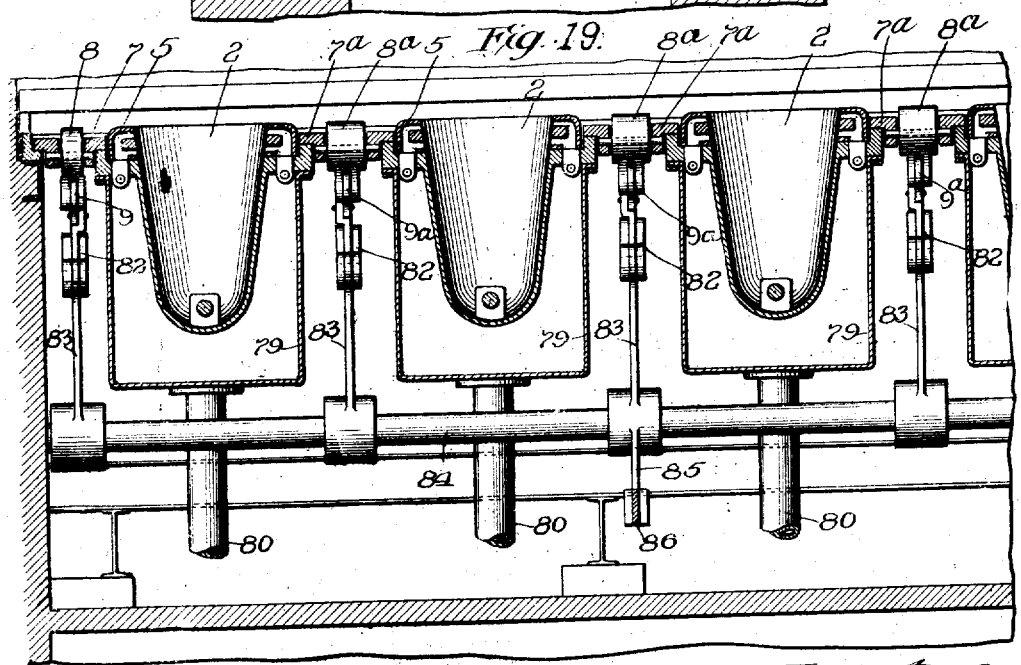

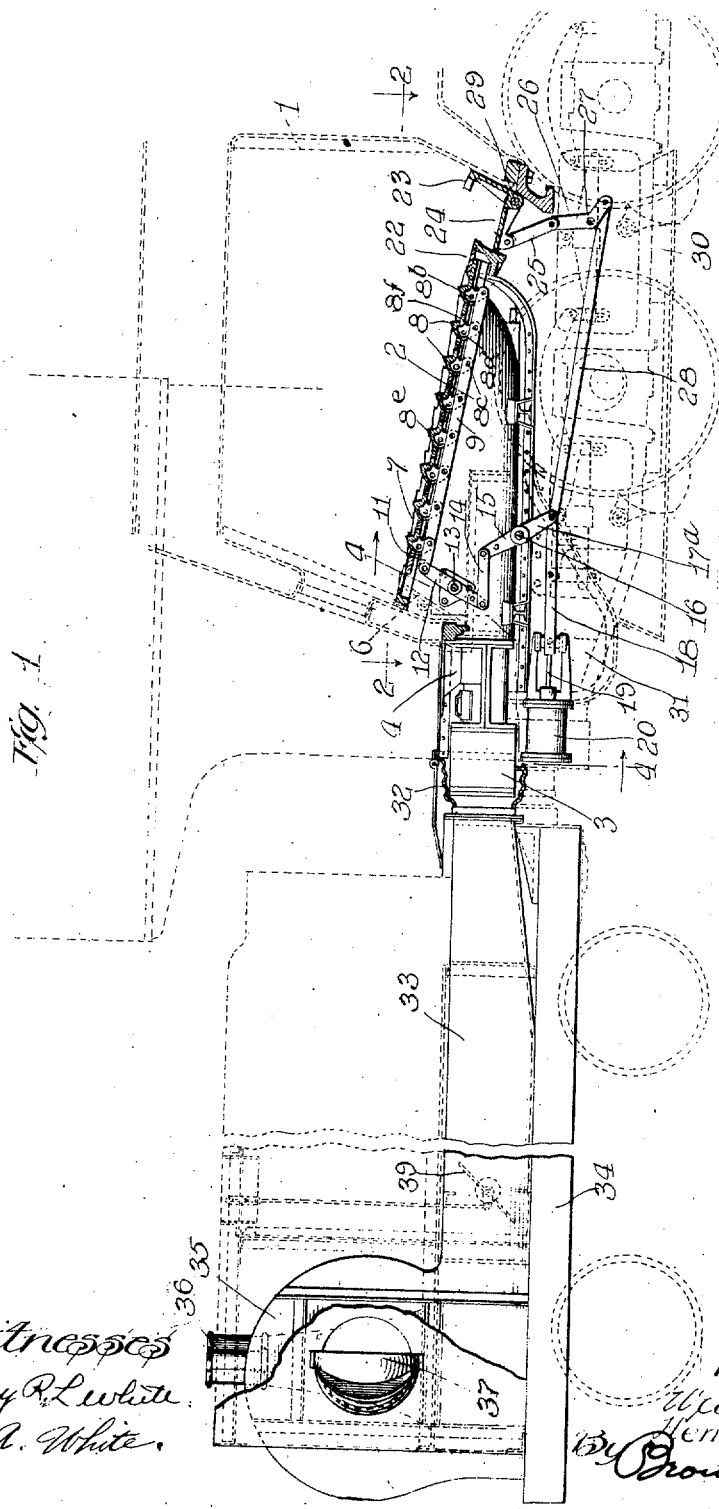

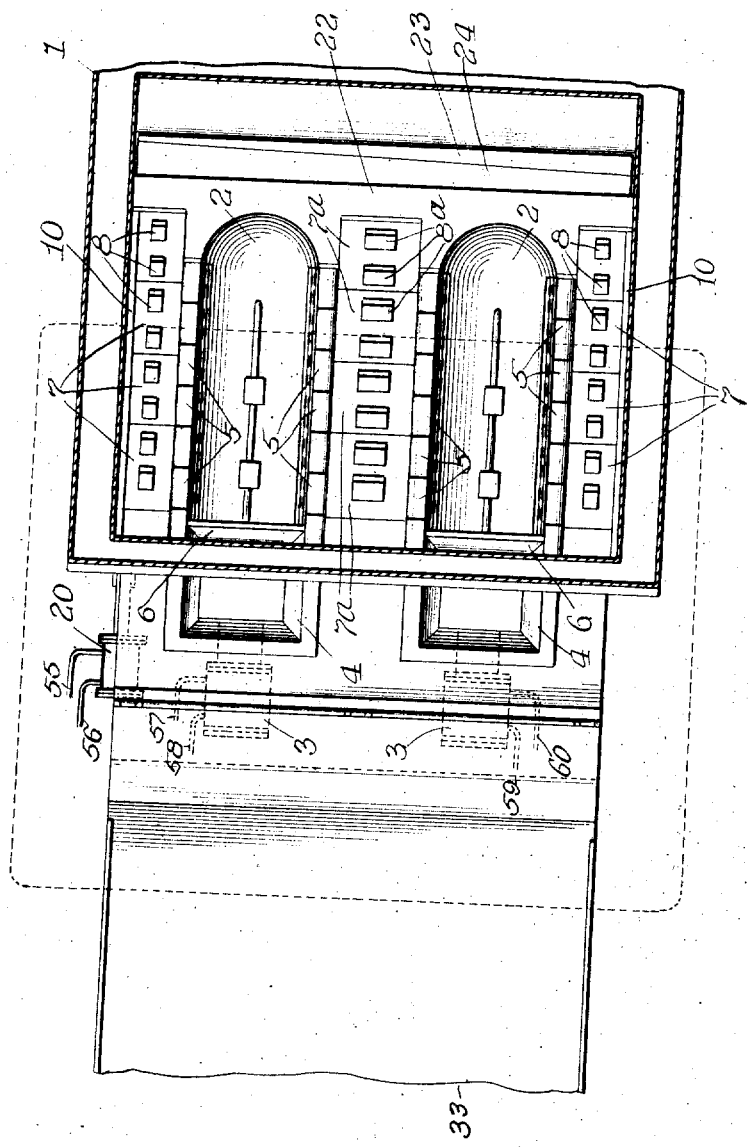

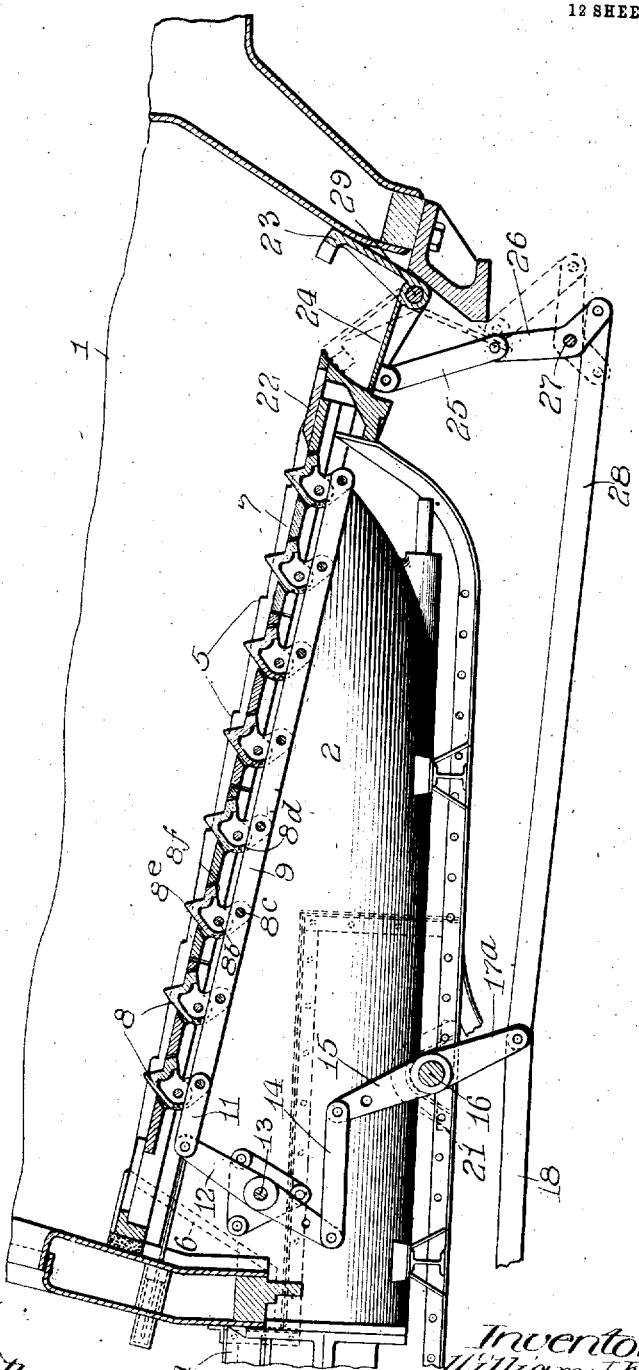

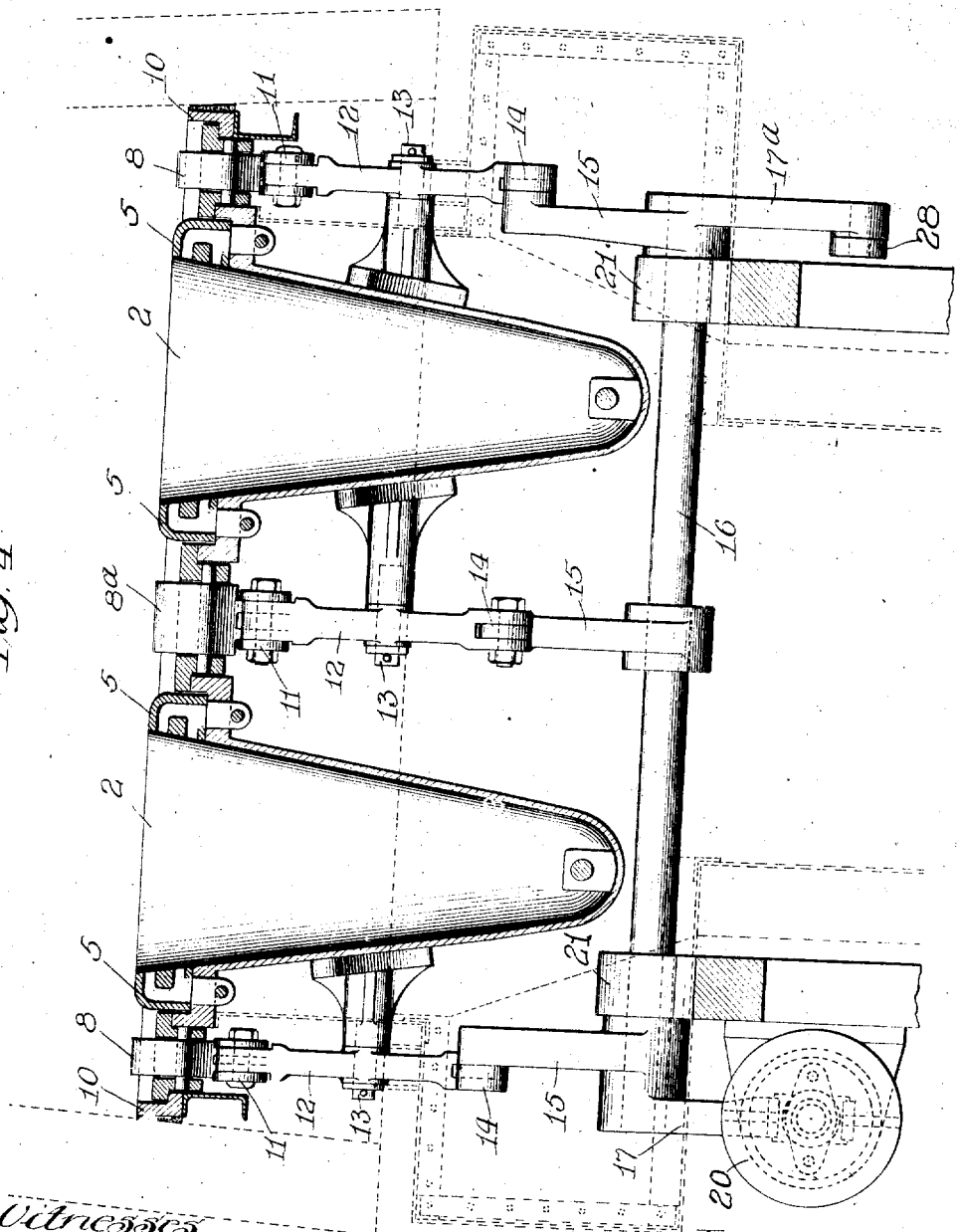

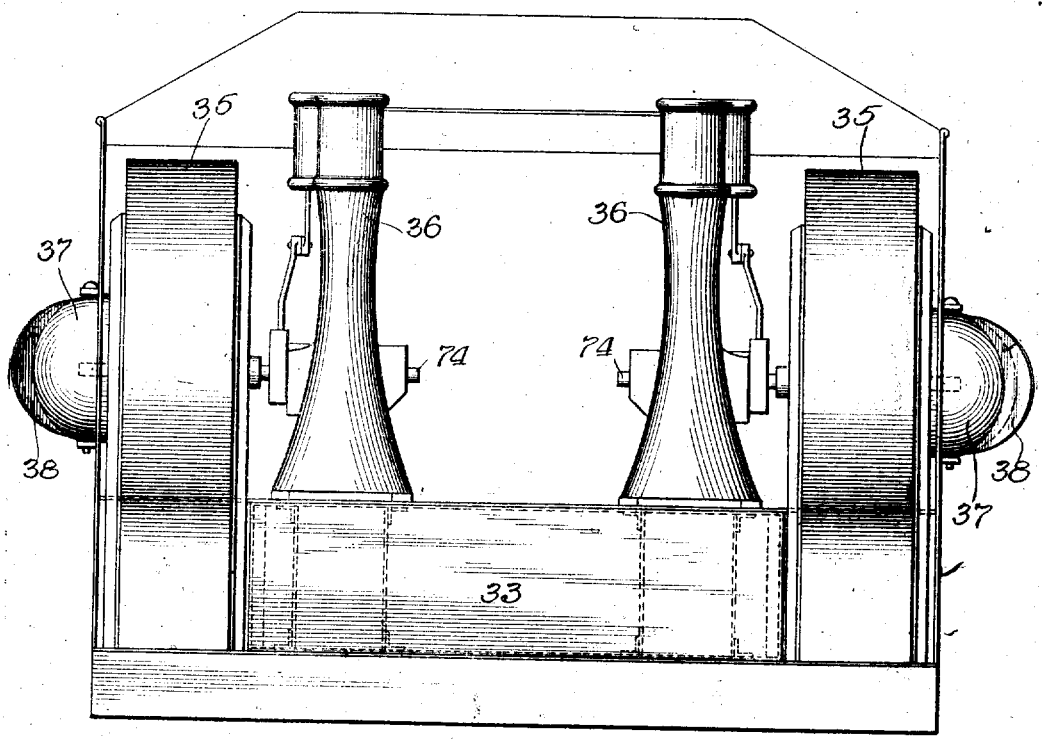
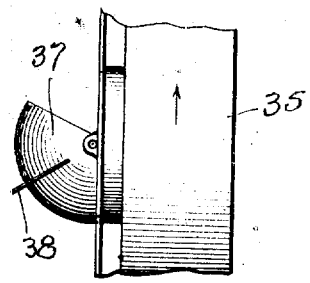
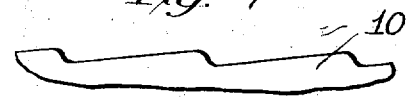
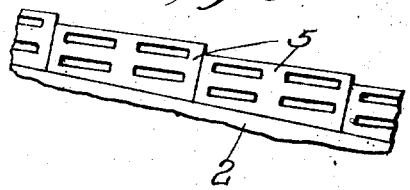

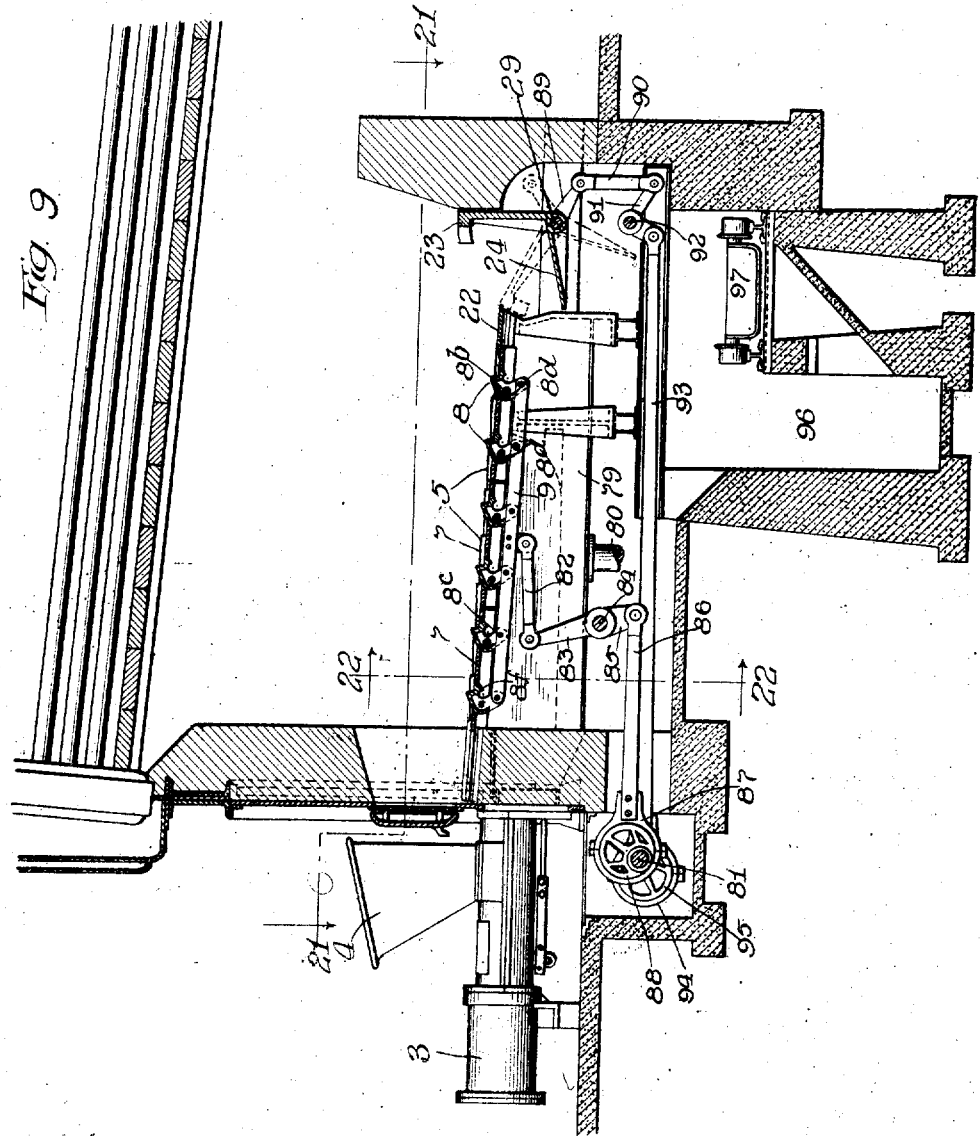

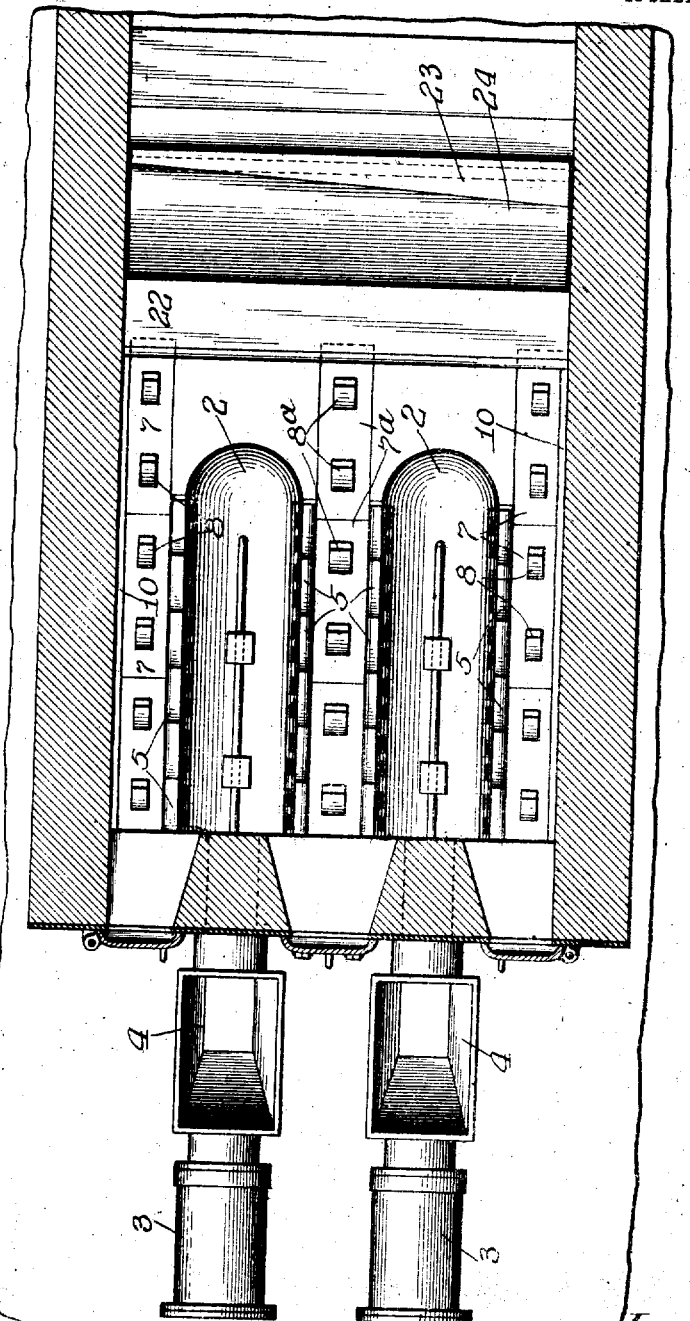

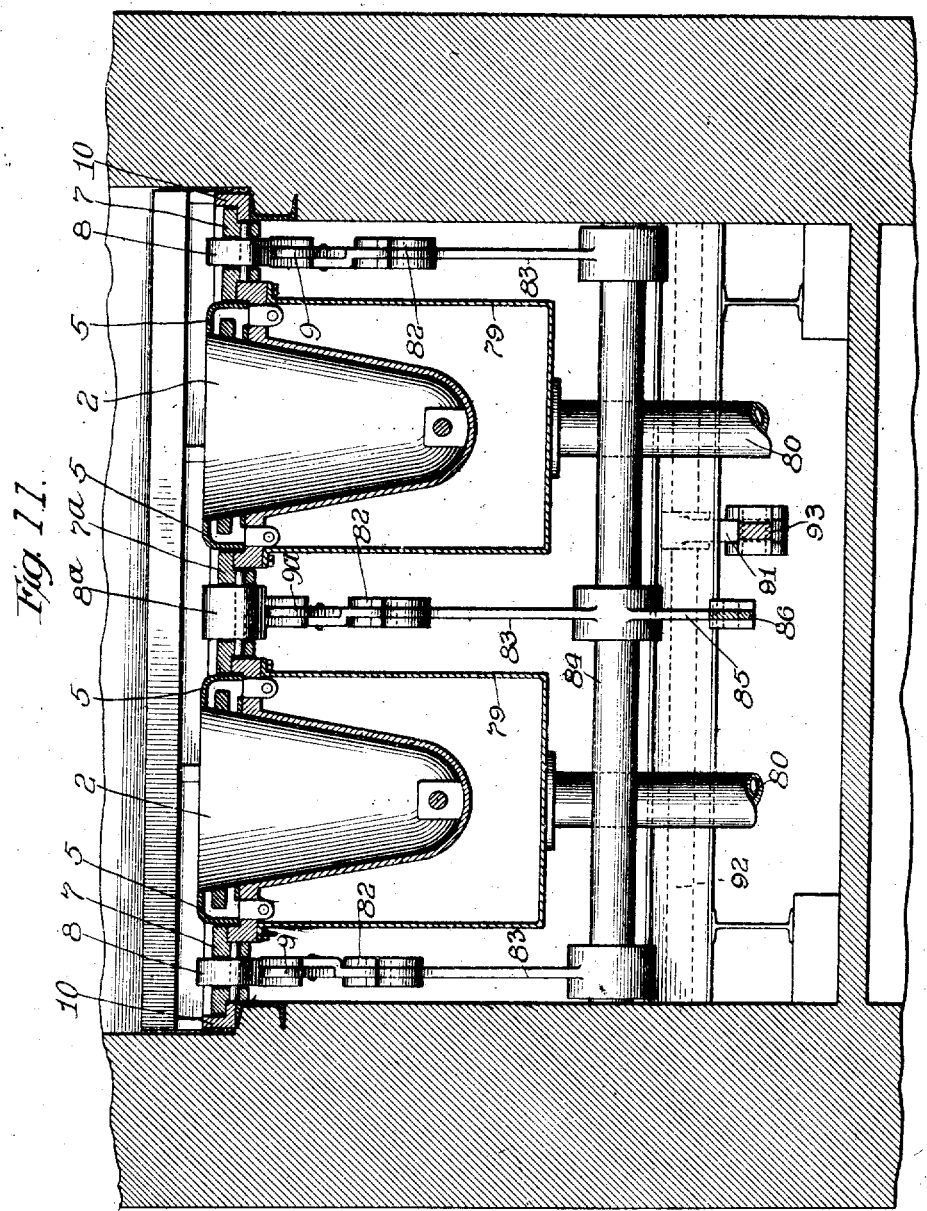

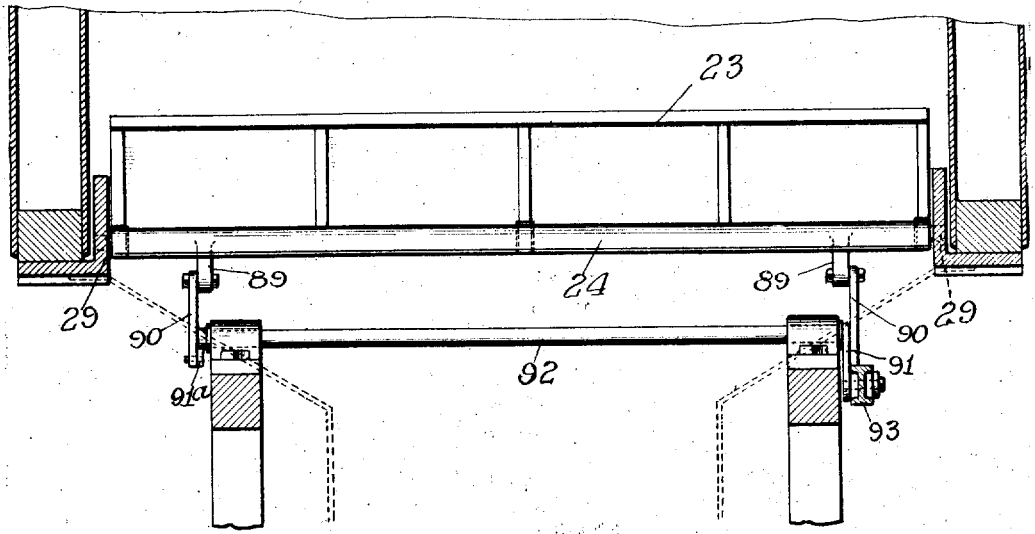
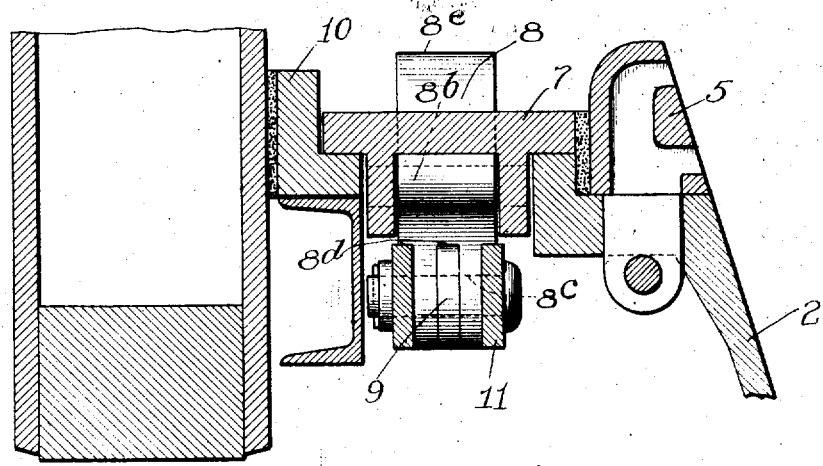
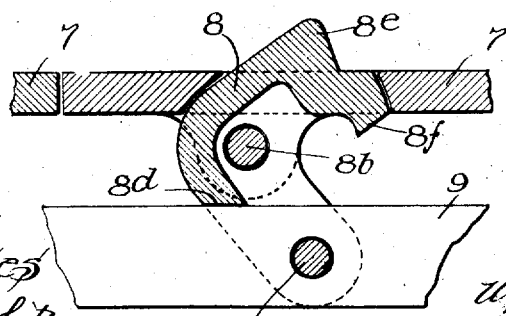

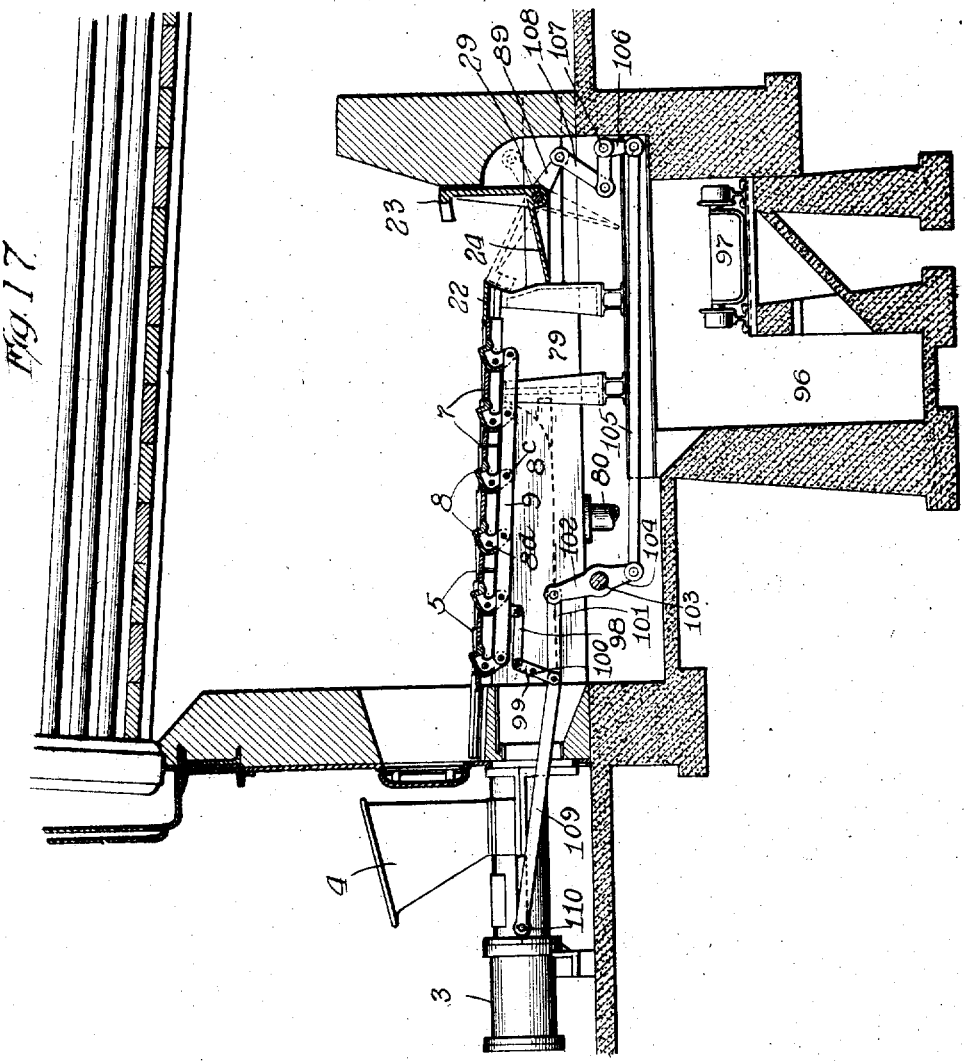

UNITED STATES PATENT OFFICE.

WILLIAM J. KENNEY AND HENRY P. GROHN, OF CHICAGO, ILLINOIS, ASSIGNORS TO THE UNDERFEED STOKER COMPANY OF AMERICA, OF CHICAGO, ILLINOIS, A CORPORATION OF NEW JERSEY.

AUTOMATIC STOKER.

1,018,976.  Specification of Letters Patent.  Patented Feb. 27, 1912.

Application filed October 12, 1908. Serial No. 457,199.

*To all whom it may concern:*

Be it known that we, WILLIAM J. KENNEY and HENRY P. GROHN, citizens of the United States, residing at Chicago, in the county of Cook and State of Illinois, have invented a new and Improved Automatic Stoker, of which the following is a specification.

Our invention relates to automatic stokers generally, and has for its object an improved construction by which the stokers may be automatically cleaned of the clinkers and ashes which accumulate during the use of the stokers.

Other objects of our invention consist in an improved construction of mechanism particularly adapted to automatic stokers of the underfeed type, such that the fires may be operated and cleaned with greater facility than has heretofore been possible.

Figure 15:
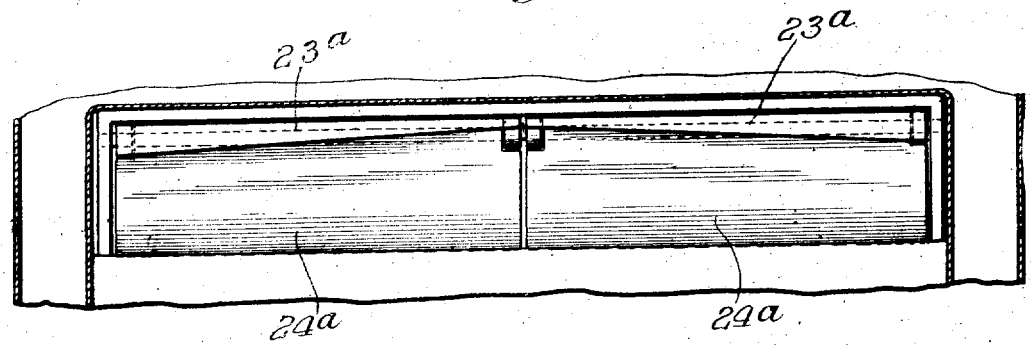
Figure 16:
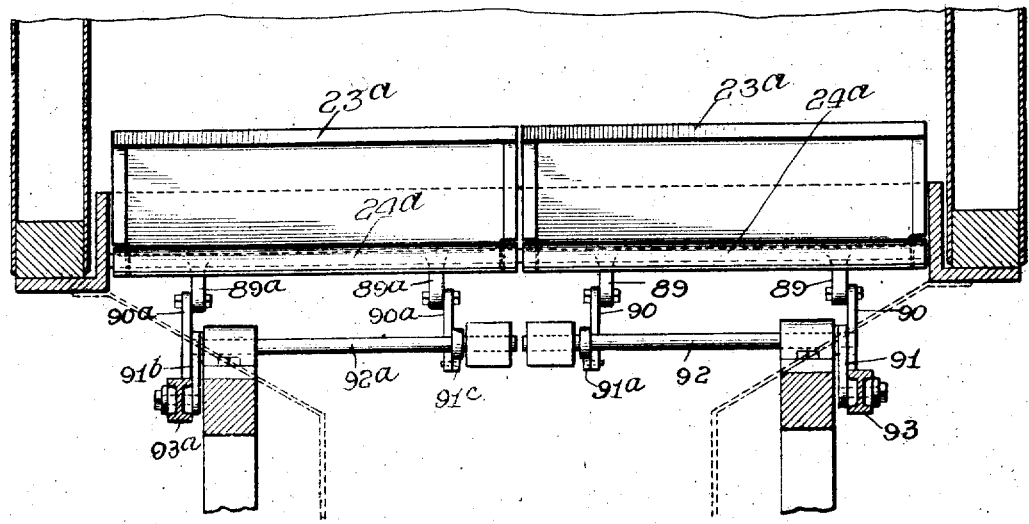

The several views illustrating our invention are as follows:

Figure 1 shows diagrammatically the rear end of a locomotive and a tender, our improved stoker mechanism being shown in side elevation as attached to the same. Fig. 2 is a top view of the stoker mechanism shown in Fig. 1, taken along the broken line 2—2; Fig. 3 is an enlarged side view of the mechanism shown in Fig. 1 contained within the furnace of the locomotive; Fig. 4 is a transverse vertical section taken along the broken line 4—4 in Fig. 1, and shows the parts contained in Fig. 1 in enlarged view; Fig. 5 is a rear end view of the tender, showing the blowers and operating mechanism therefor; Fig. 6 is a top view of a portion of the blower apparatus showing the adjustable hood for directing the air to the blower regardless of the direction of movement of the locomotive; Fig. 7 is a side view showing a fragment of one of the bars at the sides of the retorts, illustrating the shape of the edges of these bars; Fig. 8 is a view from the interior of one of the retorts and showing the upper edge of a portion of the twyer blocks; Fig. 9 is a vertical longitudinal section of our stoker construction as applied to a boiler of the stationary type; Fig. 10 is a plan view of the parts shown in Fig. 9, taken along the broken line 21—21; Fig. 11 is a transverse sectional view of the parts shown in Fig. 9, taken along the broken line 22—22; Fig. 12 is a view taken from the left, as shown in Fig. 9, of the mechanism employed to separate or cut off the mass of clinkers and ashes and remove the same from the retorts; Figs. 13 and 14 are detail views of the mechanism used to advance the clinkers and ashes along the retorts and toward the rear ends thereof, as will be explained later; Fig. 15 shows in top view a modified form of mechanism for separating or removing the clinkers and ashes from the retort, in which this moving mechanism consists of two cutter bars, instead of one, as shown in Fig. 12; Fig. 16 shows in end view the parts shown in Fig. 15; Fig. 17 is a vertical longitudinal section showing a modified form of stoker mechanism as applied to a stationary boiler; and Figs. 18 and 19 are transverse sectional views showing the adaptability of the stoker mechanism used in connection with boilers of the stationary type by which one retort or a plurality of retorts, respectively, may be employed in a single furnace.

Similar reference characters refer to similar parts throughout the several views.

Referring to Figs. 1, 2, 3 and 4, the locomotive fire box is shown at 1, and in this fire box, properly supported from the framework of the locomotive, two retorts 2 are placed. Each retort has connected with its rear end a ram 3, by which fuel placed in the hopper 4 is fed into the corresponding retort. In Fig. 1, the locomotive fire box is shown in dotted lines, as are the said locomotive and tender outlines, since they are of use only to indicate the relative location of the several parts of the stoker mechanism. Each retort, as shown in Fig. 2, has supported upon its upper edges a series of twyer blocks 5 adapted to direct air from beneath the retort into the fuel to be consumed. This fuel as it enters the retort is deflected upward in the retort by the plate 6 supported above the entrance to the retort near its front end. In connection with the twyer blocks 5, sliding plates 7 are arranged to be moved reciprocally in a direction lengthwise of the retort, as a result of which clinkers and ashes falling upon these plates as a result of the combustion will be advanced toward the rear end of the retort. Similar plates 7ᵃ to those used outside of the retorts are used between the retorts for a similar purpose. These plates 7 and 7ᵃ have supported thereon rotary dogs 8 and 8ª, respectively, which serve, as the plates 7 and 7ª are reciprocated, to facilitate the removal of the clinkers and ashes in a manner to be described. All of the dogs 8 and 8ª in one series of plates are connected together, as indicated, by bars 9 and 9ª below the plates 7 and 7ª, so that a reciprocation of these bars 9 and 9ª serves to rotate the dogs 8 and 8ª in the plates 7 and 7ª, as well as to move the plates 7 and 7ª longitudinally of the retorts 2.

Referring to Figs. 13 and 14, the detail construction and operation of the dogs 8 and 8ª will be better understood. Each dog 8, as shown in Figs. 13 and 14, is supported upon a pivot 8ᵇ carried by a plate 7, such pivot being beneath the plate. The dog 8 is of such a conformation as to engage the bar 9 by the shoulder 8ᵈ when the bar 9 is moved to the right, as shown in Fig. 14. This throws the projecting tooth 8ᵉ above the upper surface of the plate 7, and a continued motion of the bar 9 to the right causes a motion of the dog 8 and plate 7 to the right, further rotary motion of the dog 8 being prevented at this time by the engagement of the shoulder 8ᵈ and the bar 9. A pin 8ᶜ serves to connect the dog 8 and the bar 9, so that the dog 8 is rotated as the bar 9 is reciprocated. When the bar 9 is moved to the left, the dog 8 is rotated upon the pin 8ᵇ until the tooth 8ᵉ is depressed even with the upper surface of the plate 7, at which time the shoulder 8ᶠ engages the top of the bar 9 and prevents further rotation in this direction of the dog 8. As the bar 9 is moved farther to the left, the dog 8 and plate 7 are together moved to the left. Thus it will be seen that the bars 9 and 9ª when reciprocated cause rotation of the dogs 8 and 8ª and the reciprocation of the plates 7 and 7ª, the dogs 8 and 8ª being rotated so as to throw the teeth of the dogs upward when the bars 9 and 9ª and plates 7 and 7ª are advanced to the right, as shown in Figs. 1, 2 and 3; while the teeth of the dogs 8 and 8ª are depressed while the bars 9 and 9ª and the plates 7 and 7ª are moved to the left.

The tops of the twyer blocks 5 are so disposed as to constitute in effect a broken line, as shown in Fig. 8, and bars 10 disposed along the outer walls of the furnace to guide the plates 7 are similarly conformed along their upper edges, as shown in Fig. 7. The irregular conformation of the upper edges of the bars 10 and the tops of the twyer blocks 5 serves to prevent the mass of clinkers and ashes advanced by the motion to the right of the dogs and plates being drawn back with the dogs and plates when they are moved to the left, and hence the reciprocation of the plates 7 and 7ª causes an intermittent advance of the mass of clinkers and ashes. As shown in Fig. 1, the bar 9 has secured at its left-hand end a link 11 coöperating with the upper end of a lever 12 pivoted at 13 to the side of the retort 2. The lower end of the lever 12 is connected by a link 14 with the upper end of a crank 15 secured to a shaft 16. A second crank 17 secured upon the shaft 16 is connected by a link 18 with the piston rod 19 of a cylinder 20.

From the construction just described, it is apparent that the bars 9 and 9ª, secured by trains of mechanism as described to the shaft 16, which is supported transversely of the locomotive from its framework by bearings 21, may be reciprocated by the operation of the cylinder 20 as steam is communicated thereto. As shown in Fig. 2, a plate 22 extends over the right-hand ends of the retorts 2 and across the fire box, and the right-hand edge of this plate forms one member of a separating or cut-off mechanism by which the mass of clinkers and ashes as advanced is removed from the retorts, and also from the stoker. The mechanism coöperating with the plate 22 consists in an angularly-movable cutter 23 pivoted at its ends from the framework of the locomotive, and provided with a shelf 24 secured to the cutting member 23 at an angle slightly greater than a right angle. The shelf 24 is connected by a link 25 with one end of a bell crank 26 pivoted at 27 from the framework of the locomotive, the other end of this bell crank being connected by a link 28 with cranks 17ª secured to the shaft 16.

From the mechanism just described, it is apparent that the operation of the cylinder 20 not only serves to reciprocate the bars 9 and 9ª, but also serves to move the cutting member 23 and its associated shelf 24 angularly upon their support 29 in such a manner that the cutting member 23 will engage the mass of clinkers and ashes extending over the right-hand edge of the plate 22. The portion of the clinkers and ashes thus removed drops down into the ash box 30 of the locomotive.

The retorts 2 are located in the air box 31, which is separated from the ash box 30, so that air communicated under pressure to the air box 31 is forced upward through the twyer blocks 5, and cannot escape through the ash box 30. The rear end of the air box 31 is connected by a flexible conduit 32 to an air flue 33 formed along the floor of the tender 34. The air flue 33 terminates in two fans 35 adapted to be driven by engines 36, as shown in Fig. 5. To facilitate the admission of air to the fans 35, pivoted hoods 37 are provided, each having a wing 38 secured thereto, as a result of which the hood 37 is automatically shifted according to the direction of motion of the locomotive so as to present its open side toward the direction of motion, and thus to engage the air and direct it into the fan 35. A damper 39 is provided in the air flue 33, by which the amount of air supplied through the flue may be regulated as desired.

Steam for the cylinders 3—3 and 20 may be supplied through suitable pipes 55—60.

When it is desired to use our invention in connection with stationary boilers, the construction indicated in Figs. 9, 10 and 11 is sometimes desirable. In the modification shown in these figures, the retorts 2 are each completely inclosed by casings 79 in such a manner that these casings serve as air chambers to direct air from supply pipes 80—80 to the twyer blocks 5. In this modification the cleaning mechanism is identical in construction with that already described, but is arranged so that it may be operated from a common operating shaft 81 extending transversely of the boilers in a pit located just below the furnace doors. This construction is particularly advantageous if a bank of boilers is to be operated, since all of the cleaning mechanism may be driven in common from the same engine. As shown in Fig. 9, the bars 9—9ª are connected by links 82 with the upper ends of cranks 83 secured to the shaft 84. This shaft 84 is supported in suitable bearings from the walls of the furnace and extends below the air chambers 79—79. One of the crank arms 83 may be extended downward, as shown at 85, to engage a connecting rod 86 secured at its left-hand end to an eccentric strap 87 inclosing an eccentric 88 secured to the shaft 81. In this modification the cutting member 23 is arranged to be operated by a crank 89 connected by a link 90 to one arm of a bell crank 91 supported at 92 from the framework of the stoker. The other arm of this bell crank has connected thereto a link 93, the other end of which is secured to an eccentric strap 94 surrounding an eccentric 95 secured to the shaft 81. As a result of the construction just described, it is apparent that as the shaft 81 is rotated, the cleaning and cut-off mechanism are operated to produce substantially the same results as already described in connection with the other modification of our invention. An advantage to be secured by the use of eccentrics in the stationary modification is that any desired angular adjustment may be secured readily between the cleaning mechanism and the cutting-off mechanism, and further that a shaft 81 may be installed when a plant is first erected, and as extra boilers are required, connections may readily be made to the shaft 81 without difficulty. In this modification of our invention, a pit 96 is constructed under the rear end of the stoker, in which a conveyer 97 is located, which conveyer is adapted to remove the clinkers and ashes dropped thereon by the cut-off mechanism. The pit 96 further serves as a convenient means for inspecting and oiling the stoking mechanism.

In the modifications of our invention thus far described, a single cutting member is shown for the purpose of separating and removing the mass of clinkers and ashes projecting over the rear end of the retorts. In some instances it is desirable that this cutting member be divided into two or more sections; in which case the construction shown in Figs. 15 and 16 is adopted. In this case the operation is similar to that already shown, except that the shearing action secured by the inclination of the cutting or severing edge of the cutting member 23 may in this modification be so disposed on the two sections 23ª—23ª that the end thrust resulting from the cutting action is balanced, or, in other words, the cutting edges may be given opposite inclinations. Furthermore, as clearly shown in Fig. 16, this construction permits a ready displacement of one portion 23ª relatively to the other, whereby the two portions may be caused to operate at different intervals.

As shown in Fig. 17, the cleaning and cut-off mechanism may be operated directly from the ram cylinders, if desired. In this modification the bars 9 and 9ª are connected by means of links 98 with the upper ends of levers 99 pivoted at 100, the lower ends of such levers being connected by links 101 to cranks 102 secured to the shaft 103. A crank 104 secured to the shaft 103 is connected by a link 105 with one end of a bell crank 106 pivotally supported at 107 from the frame of the stoker. The other end of this bell crank 106 is connected by a link 108 with the crank 89 connected to the cutting member 23. The lower end of the lever 99 has also connected to it a link 109 extending to the left and connected at 110 with the head of the stoker ram. As a result of the construction just described, it will be observed that when the ram is operated, the cleaning and cut-off mechanism connected thereto is also operated.

In Fig. 18 a modification is shown in which, in a narrow furnace, but one retort and its coöperating mechanism may be employed; while in Fig. 19 an arrangement is shown adapted for use in a wide furnace, in which three or more retorts may be used side by side. The parts shown in Figs. 18 and 19 are identical with the corresponding parts shown in preceding figures, and already described, and hence detail reference to the construction of these figures is not thought to be necessary.

While we have shown our invention in the embodiments herein described, we do not, however, limit ourselves to this particular construction, but wish to secure broadly by our claims protection upon any equivalent construction that will suggest itself to those skilled in the art.

What we claim is:

1. In combination in a stoker, a retort for receiving the fuel to be consumed, reciprocable plates arranged longitudinally of the retort at the sides thereof for receiving clinkers and ashes, means for reciprocating said plates in the longitudinal direction to move the clinkers and ashes toward one end of the retort, and means operating during the backward motion of the reciprocable plates to remove the clinkers and ashes at said end of the retort.

2. In combination in an automatic stoker, a retort for receiving the fuel to be consumed, reciprocable plates extending longitudinally of the retort at the sides thereof for receiving clinkers and ashes, a shearing device at one end of the retort for removing clinkers and ashes projecting beyond that end of the retort, and means for reciprocating said plates so as to move the clinkers and ashes toward said device.

3. In combination in a stoker, a retort for receiving the fuel to be consumed, plates extending longitudinally of the retort along the sides thereof to receive clinkers and ashes, means for reciprocating said plates in the longitudinal direction, vertically movable members carried by said plates, and means for raising and lowering said members during the reciprocation of said plates.

4. In combination in a stoker, a retort for receiving the fuel to be consumed, a plate extending longitudinally along the side of the retort, members movably mounted on said plate, and means for simultaneously reciprocating said plate in the longitudinal direction and raising and lowering said members.

5. In combination in a stoker, a retort for receiving fuel to be consumed, a plate lying beside and extending longitudinally of said retort, movable lifting members mounted on said plate, and means for moving said plate longitudinally in one direction and simultaneously raising said lifting members and for moving said plate in the opposite direction and simultaneously lowering said members.

6. In combination in a stoker, a retort for receiving fuel to be consumed, plates arranged beside the retort and extending longitudinally thereof, lifting members movably mounted on the said plates, and actuating mechanism constructed and arranged to move said plates longitudinally in the forward direction and simultaneously raise said lifting members and to move the plates rearwardly and simultaneously lower said lifting members.

7. In combination in a stoker, a retort for receiving fuel to be consumed, plates arranged beside the retort and extending longitudinally thereof, lifting members movably mounted on the said plates, and actuating mechanism constructed and arranged to move said plates longitudinally in the forward direction and simultaneously raise said lifting members and to move the plates rearwardly and simultaneously lower said lifting members, and means at the rear end of the retort for removing the clinkers and ashes when they reach the rear end of the retort.

8. In combination in a stoker, a retort for receiving fuel to be consumed, plates arranged beside the retort and extending longitudinally thereof, lifting members movably mounted on the said plates, and actuating mechanism constructed and arranged to move said plates longitudinally in the forward direction and simultaneously raise said lifting members and to move the plates rearwardly and simultaneously lower said lifting members, and means operated during the backward motion of said plates to separate that portion of the mass of clinkers and ashes extending beyond the rear end of the retort.

9. In combination in a stoker, a retort for receiving the fuel to be consumed, a fixed shearing member arranged transversely of the retort at one end thereof, a movable shearing member adapted to coöperate with the fixed shearing member to remove that portion of the mass of clinkers and ashes extending beyond such end of the retort, and means arranged at the sides of the retort for receiving clinkers and ashes therefrom and moving them longitudinally of the retort toward said shearing members.

10. In combination in a stoker, a retort for receiving the fuel to be consumed, a fixed shearing member arranged transversely of the retort at one end thereof, a movable shearing member adapted to coöperate with the fixed shearing member to remove that portion of the mass of clinkers and ashes extending beyond such end of the retort, and means arranged at the sides of the retort for receiving clinkers and ashes therefrom and moving them longitudinally of the retort toward said shearing members, said shearing members having shearing edges disposed obliquely relatively to each other.

11. In combination in a stoker, a retort for receiving the fuel to be consumed, plates lying beside and extending longitudinally of the retort, oscillatory lifting members carried by said plates, actuating means constructed and arranged to move said plate longitudinally in the forward direction and simultaneously raise said lifting members and to move said plates backward and simultaneously oscillate said lifting members to lower them.

12. In combination a furnace, a fuel-receiving retort in said furnace, a fixed shearing member extending transversely across the rear end of said retort, a movable shearing member lying between the rear end of the retort and the rear wall of the furnace, plates lying between the sides of the retort and the side walls of the furnace, lifting members carried by said plates, and actuating means constructed and arranged to move said plates toward said shearing members and simultaneously raise said lifting members and move the plates away from said shearing members and simultaneously lower the lifting members.

13. In combination in a stoker, a retort for receiving the fuel to be consumed, twyer blocks supported by the retort, there being a discharge passage for clinkers and ashes at one end of the retort, devices arranged at the sides of the retort and movable longitudinally thereof for breaking the clinkers and ashes from the twyer blocks and positively moving them longitudinally toward said end of the retort, and means for actuating said devices.

14. In combination in a stoker, a retort for receiving the fuel to be consumed, twyer blocks supported by the retort, plates lying beside the retort and extending longitudinally thereof, lifting members movably mounted on said plates, and actuating means for moving said plates longitudinally in one direction and simultaneously raising said lifting members so as to break the clinkers and ashes from the twyer blocks and carry them longitudinally of the retort and to move said plates in the opposite direction and simultaneously lower said lifting members.

15. In combination, a furnace, a retort arranged within the furnace and having its rear end spaced apart from the adjacent wall of the furnace to provide a discharge outlet for clinkers and ashes, means for delivering fuel to the retort, supporting members between the sides of the retort and the side walls of the furnace for receiving clinkers and ashes from the retort, oscillatory dogs mounted upon said members and having portions adapted to swing longitudinally above said members, and means for moving said dogs.

16. In combination, a furnace, a retort arranged within the furnace and having its rear end spaced apart from the adjacent wall of the furnace to provide a discharge outlet for clinkers and ashes, means for delivering fuel to the retort, and supporting members arranged between the sides of the retort and the side walls of the furnace for receiving clinkers and ashes from the retort, and means associated with said supporting members for breaking up the clinkers and ashes and forcing them positively toward the rear of the retort, and means arranged adjacent to the rear end of the retort for positively removing the clinkers and ashes from said supporting members.

In witness whereof, we hereunto subscribe our names, this 7th day of October, 1908.

WILLIAM J. KENNEY.
HENRY P. GROHN.

Witnesses:
SYLVESTER S. HOWELL,
ALBERT C. BELL.